United States Patent
Kawakami (10) Patent No.: US 8,164,645 B2
(45) Date of Patent: Apr. 24, 2012

(54) IMAGE PROCESSING APPARATUS, METHOD OF CONTROLLING IMAGE PROCESSING APPARATUS, AND PROGRAM FOR CONTROLLING IMAGE PROCESSING APPARATUS

(75) Inventor: Yuichi Kawakami, Suita (JP)

(73) Assignee: Konica Minolta Holdings, Inc. (JP)

( * ) Notice: Subject to any disclaimer, the term of this patent is extended or adjusted under 35 U.S.C. 154(b) by 424 days.

(21) Appl. No.: 12/443,262

(22) PCT Filed: Sep. 21, 2007

(86) PCT No.: PCT/JP2007/068389
§ 371 (c)(1),
(2), (4) Date: Mar. 27, 2009

(87) PCT Pub. No.: WO2008/041518
PCT Pub. Date: Apr. 10, 2008

(65) Prior Publication Data
US 2010/0007756 A1    Jan. 14, 2010

(30) Foreign Application Priority Data
Oct. 2, 2006   (JP) .................................. 2006-270725

(51) Int. Cl.
*H04N 5/235*   (2006.01)

(52) U.S. Cl. .................................................. 348/222.1

(58) Field of Classification Search .............. 348/42, 348/222.1
See application file for complete search history.

(56) References Cited

U.S. PATENT DOCUMENTS

| | | | | |
|---|---|---|---|---|
| 5,361,330 A | * | 11/1994 | Fujisaki et al. | 358/1.7 |
| 5,684,890 A | * | 11/1997 | Miyashita et al. | 382/154 |
| 6,269,195 B1 | * | 7/2001 | Gonsalves et al. | 382/284 |
| 6,356,300 B1 | * | 3/2002 | Shiba | 348/130 |
| 6,987,535 B1 | * | 1/2006 | Matsugu et al. | 348/239 |
| 7,218,793 B2 | * | 5/2007 | Perlmutter et al. | 382/266 |
| 2002/0041704 A1 | * | 4/2002 | Yamamoto | 382/154 |
| 2002/0141635 A1 | * | 10/2002 | Swift et al. | 382/154 |

(Continued)

FOREIGN PATENT DOCUMENTS
JP   2000-88523 A   3/2000
(Continued)

OTHER PUBLICATIONS

S. Nagashima et al., "Improving Performance for Subpixel Image Matching Based on Phase-Only Correlation", The Society of Instrument and Control Engineers Tohoku Chaper, 218th Workshop, material No. 218-15, Oct. 9, 2004, pp. 1-10; together with a partial English Translation.

(Continued)

*Primary Examiner* — Lin Ye
*Assistant Examiner* — Amy Hsu
(74) *Attorney, Agent, or Firm* — Cantor Colburn LLP (57) ABSTRACT

An apparatus received input of a base image and a reference image that are images picked up by two cameras provided on left and right. A window setting portion determines a size of a window based on an edge value of an image around a gaze point in the base image. A position deviation operation portion operates deviation between the image in the window of the base image and the image in the window of the reference image. A three-dimensional coordinate operation portion operates a three-dimensional coordinate of a surface of an object based on deviation between the images.

13 Claims, 11 Drawing Sheets

U.S. PATENT DOCUMENTS

| | | | |
|---|---|---|---|
| 2006/0034541 A1* | 2/2006 | Perlmutter et al. | 382/275 |
| 2008/0024614 A1* | 1/2008 | Li et al. | 348/207.99 |
| 2008/0080762 A1* | 4/2008 | Kawakami | 382/154 |

FOREIGN PATENT DOCUMENTS

| | | |
|---|---|---|
| JP | 2001-194126 A | 7/2001 |
| JP | 2006-10392 A | 1/2006 |
| WO | WO 2008/041518 A1 | 4/2008 |

OTHER PUBLICATIONS

Japanese "Notice of Grounds of Rejection" dated Jun. 29, 2010, for Japanese Application No. 537459/2008, together with an English-language translation thereof.

* cited by examiner

BASE IMAGE

REFERENCE IMAGE

BASE IMAGE

FIG.7

REFERENCE IMAGE

IMAGE PROCESSING APPARATUS, METHOD OF CONTROLLING IMAGE PROCESSING APPARATUS, AND PROGRAM FOR CONTROLLING IMAGE PROCESSING APPARATUS

This application is a National Stage of International Application No. PCT/JP2007/68389, filed with the Japanese Patent Office on Sep. 21, 2007, which is based on Japanese Patent Application No. 2006-270725.

TECHNICAL FIELD

The present invention relates to an image processing apparatus, a method of controlling an image processing apparatus, and a program for controlling an image processing apparatus, and particularly to an image processing apparatus capable of operating correspondence between a base image and a reference image, a method of controlling the image processing apparatus, and a program for controlling the image processing apparatus.

BACKGROUND ART

In the field of face authentication or cosmetic surgery, three-dimensional shape measurement of a face is highly demanded. In such a field, it is not preferred to direct intense light toward eyes and movement of a face is likely during measurement. Therefore, a passive method such as a stereo method is more suitable than an active method such as scanning with laser beams or the like.

A stereo correspondence search algorithm using phase-only correlation (POC) (an algorithm bringing identical points in images consisting of a base image and a reference image, each of which is a stereo image, into correspondence with each other) has attracted attention in terms of its robustness and high accuracy.

Patent Document 1 below discloses a through hole measurement system applying the phase-only correlation method to a stereo camera.

Non-Patent Document 1 below discloses a window size and noise influence in a POC operation.

Patent Document 1: Japanese Laid-Open Patent Publication No. 2006-010392

Non-Patent Document 1: "Improving Performance for Subpixel Image Matching Based on Phase-Only Correlation," The Society of Instrument and Control Engineers Tohoku Chapter, 218th Workshop, Oct. 9, 2004, material number 218-15

DISCLOSURE OF THE INVENTION

Problems to be Solved by the Invention

For example, in three-dimensional measurement of a face, there has been a demand for reproducing a shape of a feature portion such as eyes, nose and mouth while smoothly reproducing a surface of a cheek or the like, and approaches to satisfy such a demand in stereo three-dimensional measurement have been required.

The present invention was made to solve such a problem, and an object of the present invention is to provide an image processing apparatus capable of satisfactorily performing an operation of correspondence between a base image and a reference image, a method of controlling the image processing apparatus, and a program for controlling the image processing apparatus.

Means for Solving the Problems

In order to achieve the above-described object, according to one aspect of the present invention, an image processing apparatus includes: image input means for receiving input of a base image and a reference image; first window setting means for setting a window on the base image; second window setting means for setting a window on the reference image; operation means for operating, based on an image in the window set by the first window setting means and an image in the window set by the second window setting means, correspondence between these images; extraction means for extracting an image feature value of at least a part of the image in the window set by one of the first window setting means and the second window setting means; and changing means for changing at least one of a size and a shape of the window based on the extracted image feature value.

Preferably, the image feature value includes an edge value of the image.

Preferably, the operation means finds one point in the reference image corresponding to one point in the base image, based on a correlation value between the images in two windows.

Preferably, the image processing apparatus further includes a three-dimensional coordinate operation portion for operating a three-dimensional coordinate of an object included in the base image and the reference image, based on a result of operation by the operation means.

Preferably, the extraction means extracts edge distribution in the window, and the changing means determines at least one of the size and the shape of the window based on the edge distribution.

Preferably, the extraction means measures an edge value in a central portion of the window, and the changing means reduces the size of the window when the edge value in the central portion of the window is equal to or greater than a prescribed value.

Preferably, the extraction means measures an edge value in a central portion of the window and an edge value in a peripheral portion, and the changing means reduces the size of the window when there is a difference between the edge value in the central portion of the window and the edge value in the peripheral portion.

According to another aspect of the present invention, a method of controlling an image processing apparatus includes: an image input step of receiving input of a base image and a reference image; a first window setting step of setting a window on the base image; a second window setting step of setting a window on the reference image; an operation step of operating, based on an image in the window set in the first window setting step and an image in the window set in the second window setting step, correspondence between these images; extraction step of extracting an image feature value of at least a part of the image in the window set in one of the first window setting step and the second window setting step; and changing step of changing at least one of a size and a shape of the window based on the extracted image feature value.

According to yet another aspect of the present invention, a program for controlling an image processing apparatus causes a computer to perform: an image input step of receiving input of a base image and a reference image; a first window setting step of setting a window on the base image; a second window setting step of setting a window on the reference image; an operation step of operating, based on an image in the window set in the first window setting step and an image in the window set in the second window setting step, correspondence between these images; extraction step of extracting an image feature value of at least a part of the image in the window set in one of the first window setting step and the second window setting step; and changing step of changing at least one of a size and a shape of the window based on the extracted image feature value.

Effects of the Invention

According to these inventions, an image processing apparatus capable of satisfactorily performing an operation of correspondence between a base image and a reference image, a method of controlling an image processing apparatus, and a program for controlling an image processing apparatus can be provided.

DESCRIPTION OF THE REFERENCE SIGNS 100R, 100L camera; 200 processor; 201 window setting portion; 203 base image window setting portion; 205 reference image window setting portion; 207, 209 DFT portion; 211 phase comparison portion; 213 position deviation operation portion; 215 three-dimensional coordinate operation portion; and 300 display apparatus.

BEST MODES FOR CARRYING OUT THE INVENTION

Figure 1:
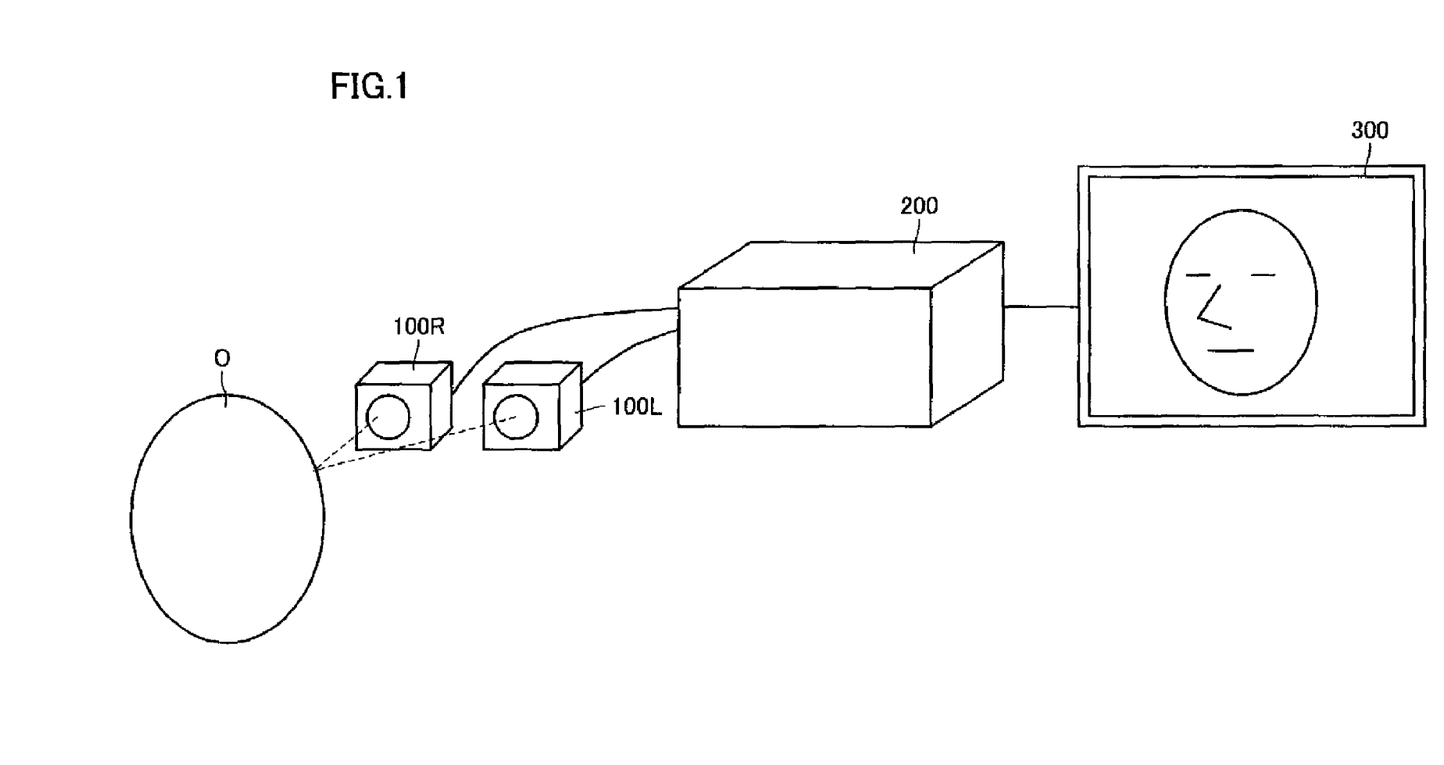
FIG. 1 illustrates a configuration of a three-dimensional measurement apparatus according to one embodiment of the present invention.

Referring to FIG. 1, a three-dimensional measurement apparatus according to one embodiment of the present invention is constituted of two cameras 100R, 100L arranged on the left and right, a processor 200 connected to the cameras, and a display apparatus 300.

Cameras 100R, 100L pick up a two-dimensional image of an object O (herein a face of a person is illustrated). Camera 100R and camera 100L are provided at a prescribed distance from each other on the left and the right. A stereo image can thus be obtained.

Processor 200 operates a three-dimensional shape of the object from the images picked up by the two cameras. Display apparatus 300 displays the measured three-dimensional shape of the object. Alternatively, obtained data of three-dimensional shape (data of X, Y and Z coordinate) may be stored in a storage medium, without displaying the same.

Figure 2:
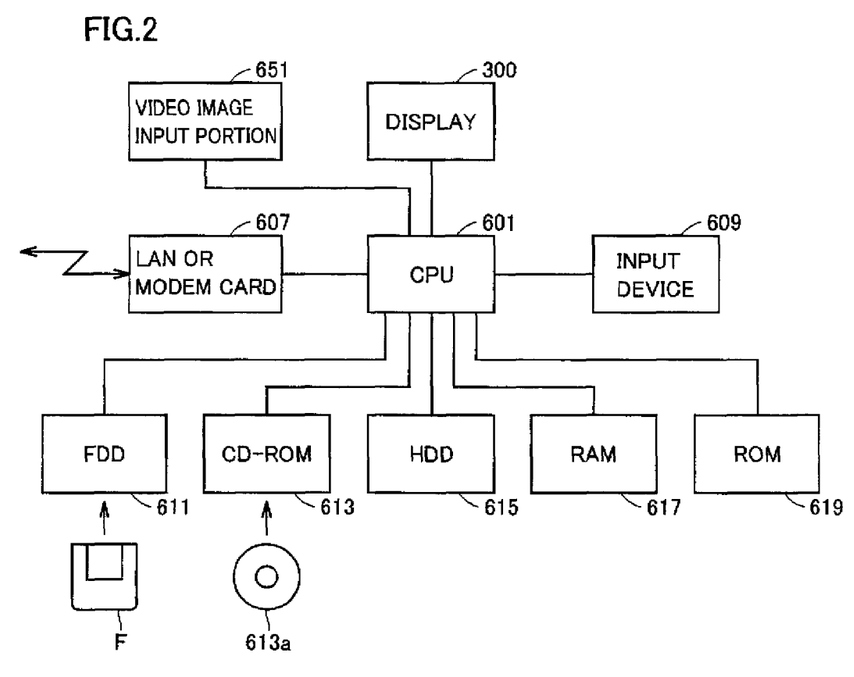
FIG. 2 is a block diagram showing a hardware configuration of a processor 200 in FIG. 1.

Referring to FIG. 2, processor 200 includes a CPU 601 for overall control of the apparatus, a LAN (local area network) card 607 (or a modem card) for connection to a network or for communication with external elements, an input device 609 including a keyboard, a mouse and the like, a flexible disk drive 611, a CD-ROM drive 613, a hard disk drive 615, a RAM 617, and a ROM 619.

Processor 200 receives the image picked up by the camera via a video image input portion 651.

In addition, processor 200 is connected to display apparatus (display) 300.

A program or data such as an image recorded in a flexible disk F can be read by means of flexible disk drive 611, and a program or data such as an image recorded in a CD-ROM 613a can be read by means of CD-ROM drive 613.

Processor 200 may be provided with a DVD drive, a memory card reader, or the like for input of an image such as a stereo photograph. A hard disk drive is preferably used for storing images.

In addition, a terminal for video signal output to television may be provided, for display of an image such as a photograph.

Figure 3:
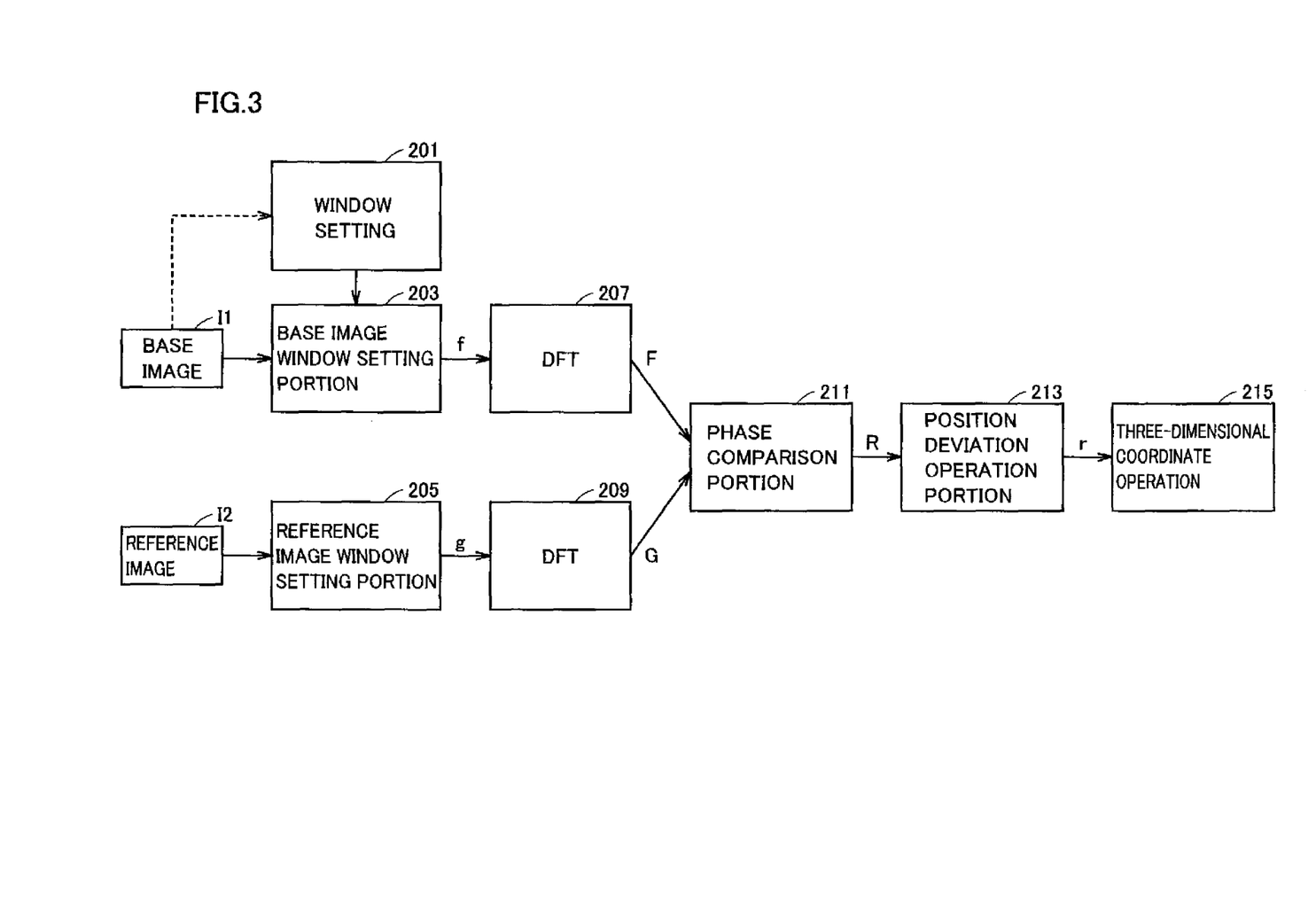
FIG. 3 is a block diagram showing a functional configuration of processor 200.

Referring to FIG. 3, processor 200 receives a base image I1 which is an image picked up by camera 100L and a reference image I2 which is an image picked up by camera 100R.

Processor 200 includes a window setting portion 201 for setting a size (or a shape, or the like) of a window to be used for a base image based on a feature of base image I1, a base image window setting portion 203 for setting a position of the window for scanning base image I1, a reference image window setting portion 205 for setting a position of a window for scanning reference image I2, a DFT portion 207 for performing two-dimension discrete Fourier transform (2D DFT) upon a portion of the base image shown in the window, a DFT portion 209 for performing two-dimension discrete Fourier transform upon a portion of the reference image shown in the window, a phase comparison portion 211 for comparing phases of two images resulting from DFT processing, a position deviation operation portion 213 for operating deviation between two images, and a three-dimensional coordinate operation portion 215 for operating a three-dimensional coordinate of the surface of object O based on the position deviation.

It is noted that the image in the window of the base image is denoted by f, the image thereof resulting from DFT processing is denoted by F, the image in the window of the reference image is denoted by g, the image thereof resulting from DFT processing is denoted by G, combined phase spectrum representing the output of phase comparison portion 211 is denoted by R, and a POC function representing the output of position deviation operation portion 213 is denoted by r.

Figure 4:
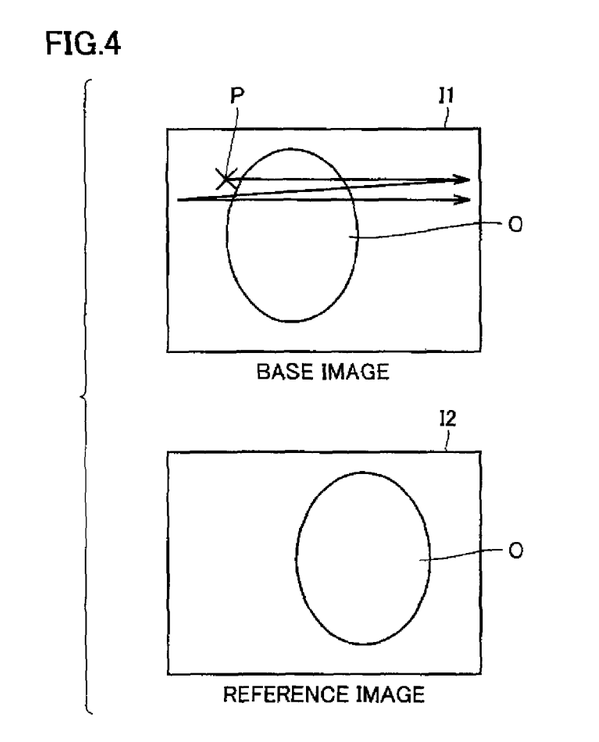
FIG. 4 illustrates scanning of a gaze point.

Scanning of a gaze point will now be described with reference to FIG. 4.

Processor 200 sets gaze point P on base image I1 and finds a position corresponding to gaze point P on reference image I2, so as to detect position deviation between these images at the gaze point. In addition, processor 200 operates the three-dimensional coordinate at that gaze point based on the detected position deviation.

Figure 5:
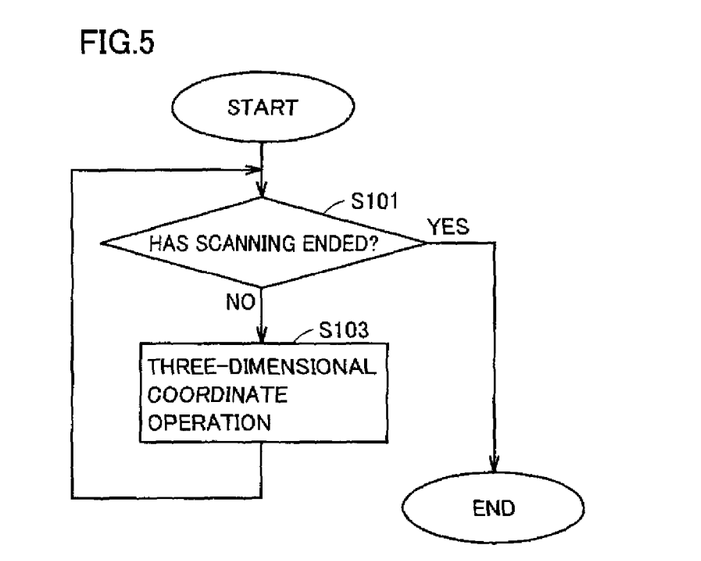
FIG. 5 is a flowchart showing processing for scanning the gaze point.

Processing for scanning the gaze point will be described with reference to FIG. 5.

Processor 200 performs operation of the three-dimensional coordinate while moving the gaze point (S103) until scanning ends (NO in S101), and as scanning ends (YES in S101), processor 200 stops the operation. A group of three-dimensional points based on scanning of the gaze point can thus be obtained.

Figure 6:
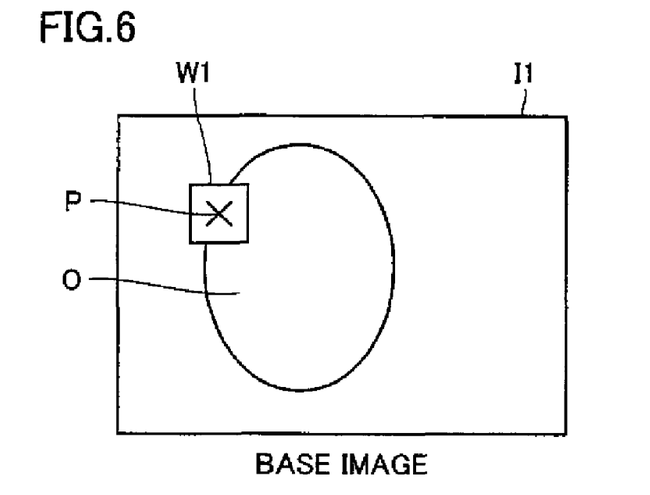
FIG. 6 illustrates window setting processing for a base image.

Window setting processing for the base image will be described with reference to FIG. 6. Initially, processor 200 sets a window W1 centered on gaze point P in base image I1. Here, a size (or a shape) of window W1 is determined based on edge information of the image around gaze point P. This determination processing will be described later.

Window setting processing for the reference image will be described with reference to FIG. 7. Processor 200 scans reference image I2 through a window W2 (equal to window W1 in size and shape), and sets a pattern closest to the image in window W1 on base image I1 as the corresponding location on the reference image. Determination of closeness can be made by performing an operation of correlation between windows, a SAD (Sum of Absolute Differences) operation, and the like. The point corresponding to gaze point P on base image I1 can thus be set.

Figure 7:
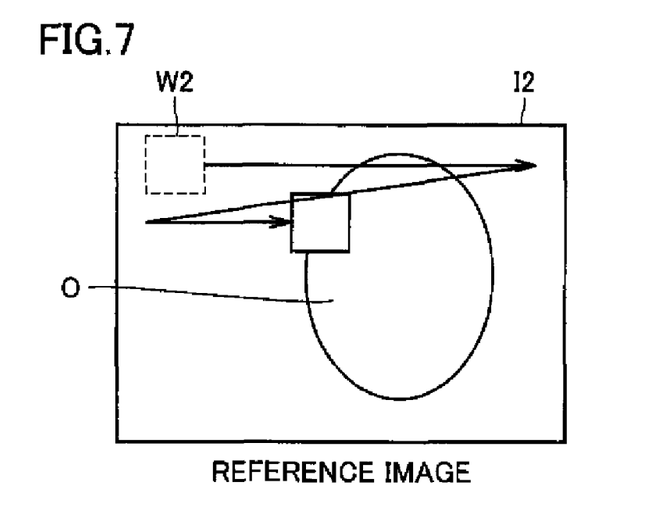
FIG. 7 illustrates window setting processing for a reference image.

The window is moved also in a vertical direction in FIG. 7. So long as two cameras are provided horizontally, however, image deviation between the base image and the reference image occurs only in the horizontal direction. Therefore, the window may be moved only in a horizontal direction.

In addition, as to the window of the reference image, correspondence with the base image may be examined by moving over a wide range, however, correspondence between the base image and the reference image may be examined by determining an "initial value" for search in advance and then moving the window of the reference image only within a prescribed range from the initial value. Namely, correspondence between the base image and the reference image may be found by using an image of low resolution, and an initial value for an image of high resolution may be set by using that result.

Two images having an image size of $N_1 \times N_2$ pixels are expressed as $f(n_1, n_2)$ and $g(n_1, n_2)$ respectively. For the sake of formulation, an index for discrete space is defined as $n_1 = -M_1, \ldots, M_1$ and $n_2 = -M_2, \ldots, M_2$, and the image size is defined as $N_1 = 2M_1 + 1$ pixel and $N_2 = 2M_2 + 1$ pixel. These images subjected to two-dimension discrete Fourier transform (2D DFT) are expressed as $F(k_1, k_2)$ and $G(k_1, k_2)$ and provided in the following equations, respectively.

$$F(k_1, k_2) = \sum_{n_1 n_2} f(n_1, n_2) W_{N_1}^{k_1 n_1} W_{N_2}^{k_2 n_2} \quad (1)$$
$$= A_F(k_1, k_2) e^{j\theta_F(k_1, k_2)}$$

$$G(k_1, k_2) = \sum_{n_1 n_2} g(n_1, n_2) W_{N_1}^{k_1 n_1} W_{N_2}^{k_2 n_2} \quad (2)$$
$$= A_G(k_1, k_2) e^{j\theta_G(k_1, k_2)}$$

where $k_1 = -M_1, \ldots M_1$, $k_2 = -M_2, \ldots, M_2$, $$W_{N_1} = e^{-j\frac{2\pi}{N_1}}, \; W_{N_2} = e^{-j\frac{2\pi}{N_2}}, \text{ and } \sum_{n_1 n_2}$$

is $$\sum_{n_1=-M_1}^{M_1} \sum_{n_2=-M_2}^{M_2}.$$

$A_F(k_1, k_2)$, $A_G(k_1, k_2)$ represent amplitude components of image signals $f(n_1, n_2)$ and $g(n_1, n_2)$ respectively, and $e^{j\theta_F(k_1, k_2)}$, $e^{j\theta_G(k_1, k_2)}$ represent phase components of respective signals. Combined phase spectrum $\hat{R}(k_1, k_2)$ is defined as follows:

$$\hat{R}(k_1, k_2) = \frac{F(k_1, k_2)\overline{G(k_1, k_2)}}{|F(k_1, k_2)\overline{G(k_1, k_2)}|} \quad (3)$$
$$= e^{j\theta(k_1, k_2)}$$

where $\overline{G(k_1, k_2)}$ is a complex conjugate of $G(k_1, k_2)$. In addition, $\theta(k_1, k_2) = \theta_F(k_1, k_2) - \theta_G(k_1, k_2)$.

First processing performed by phase comparison portion 211 will be described with reference to FIG. 8. DFT portions 207 and 209 calculate $F(k_1, k_2)$ and $G(k_1, k_2)$ respectively, and phase comparison portion 211 calculates combination thereof as follows.

$$F(k_1, k_2) \cdot \overline{G(k_1, k_2)} \quad (4)$$

Position deviation between the images in two windows is expressed as phase gradient in Equation (4).

Figure 9:
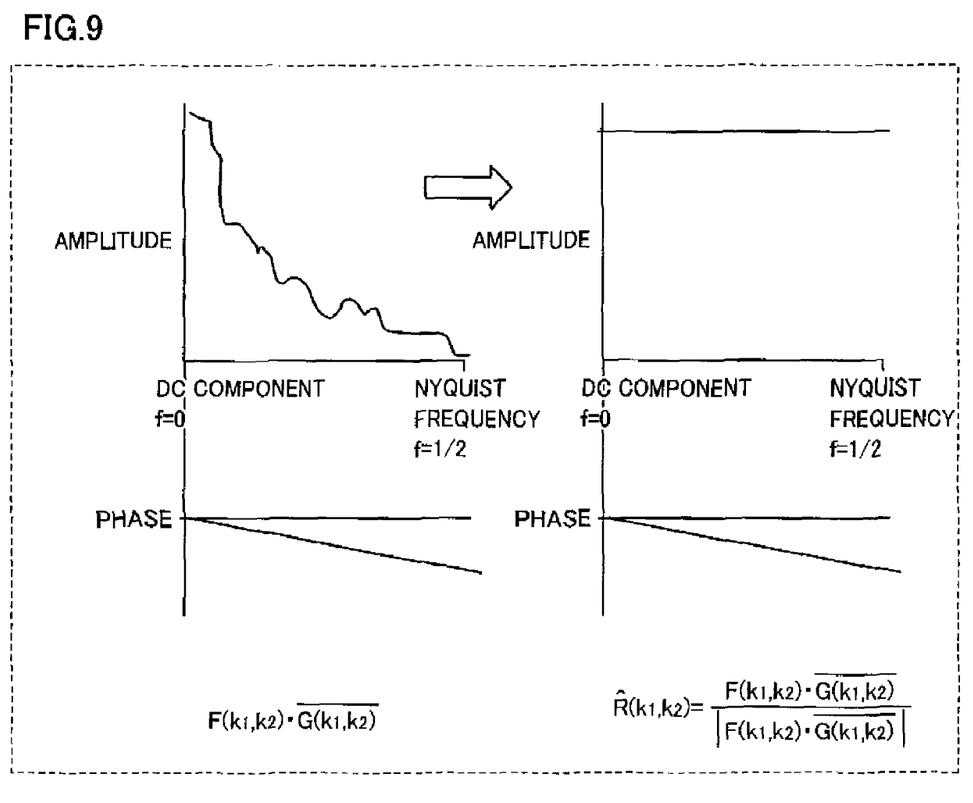
FIG. 9 illustrates second processing performed by phase comparison portion 211.

Second processing performed by phase comparison portion 211 will be described with reference to FIG. 9.

Figure 8:
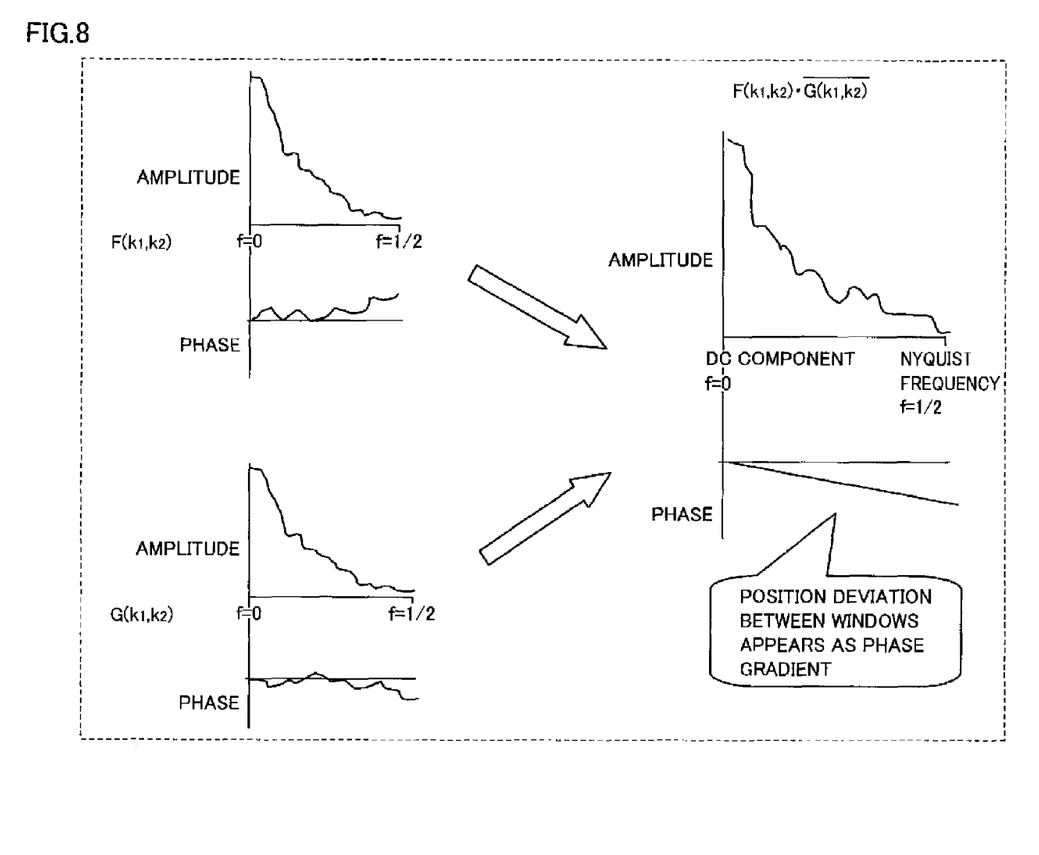
FIG. 8 illustrates first processing performed by a phase comparison portion 211.

Here, based on the result of operation shown in FIG. 8, processing for calculating the following is performed.

$$\hat{R}(k_1, k_2) = \frac{F(k_1, k_2) \cdot \overline{G(k_1, k_2)}}{|F(k_1, k_2) \cdot \overline{G(k_1, k_2)}|} \quad (5)$$

Initially, position deviation operation portion 213 operates a phase-only correlation (POC) function by subjecting phase difference spectrum, resulting from comparison of phase in a frequency domain, to inverse Fourier transform.

Phase-only correlation (POC) function $\hat{r}(n_1, n_2)$ is two-dimension discrete inverse Fourier transform (2D IDFT) of $\hat{R}(k_1, k_2)$ and defined in the following equation.

$$\hat{r}(n_1, n_2) = \frac{1}{N_1 N_2} \sum_{k_1 k_2} \hat{R}(k_1, k_2) W_{N_1}^{-k_1 n_1} W_{N_2}^{-k_2 n_2} \quad (6)$$

$$\text{where} \sum_{k_1 k_2} \text{means} \sum_{k_1=-M_1}^{M_1} \sum_{k_2=-M_2}^{M_2}.$$

Figure 10:
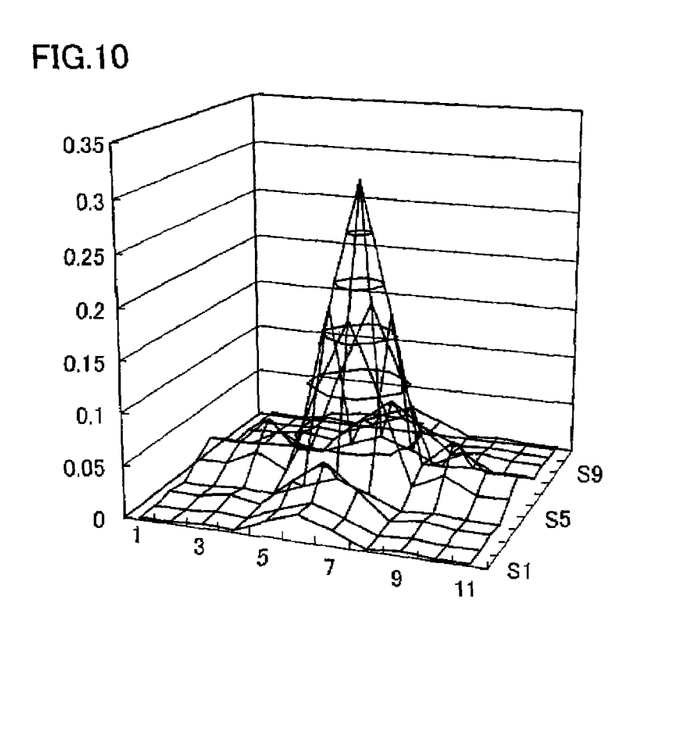
FIG. 10 illustrates a specific example of a phase-only correlation (POC) function.

As shown in FIG. 10, the phase-only correlation (POC) function is prone to have a steep correlation peak in the coordinate of a deviation between images (between the base window and the reference window), and it is characterized by its high robustness in image matching and accuracy in estimation of the deviation. Therefore, position deviation operation portion 213 operates an amount of position deviation between the images by estimating the POC peak. As the POC is calculated discretely, the coordinate of the corresponding point can be found with high resolution by estimating the peak position in a unit of subpixel. In case of performing interpolation, a method of fitting a function such as a parabola or the like may be employed.

Processing performed by three-dimensional coordinate operation portion 215 will be described with reference to FIG. 11. Herein, a camera capturing the base image is referred to as a base camera and a camera capturing the reference image is referred to as a reference camera, and FIG. 11 shows a positional relation among an image pickup surface, an object to be picked up, and a focus position.

For the sake of brevity, in the present embodiment, it is assumed that aberration of a stereo camera is satisfactorily adjusted and two cameras are provided in parallel. Even if actual configuration is not under such conditions, an equivalent image may be obtained by image processing.

Figure 11:
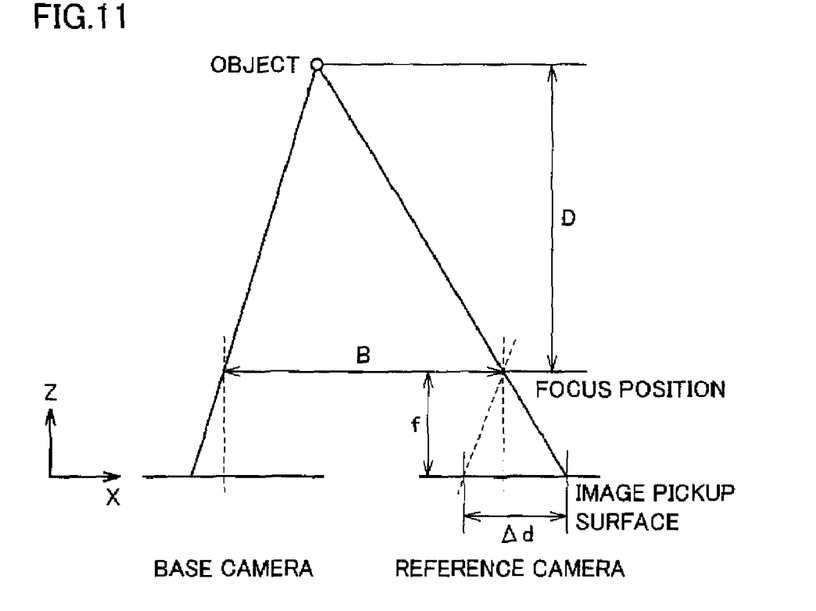
FIG. 11 illustrates processing performed by a three-dimensional coordinate operation portion 215.

In FIG. 11, if a difference in the position of the corresponding point between the images captured in the base camera and the reference camera is $\Delta d$, a distance D to the object is calculated in the equation below, where a length of the base line of the cameras (distance between optical axes of two cameras) is denoted by B and a focal length of a camera lens is denoted by f.

$$D = \frac{fB}{\Delta d} \quad (7)$$

Three-dimensional position (X, Y, Z) of the object is calculated in the following equation:

$$X = x \frac{D}{f} \quad (8)$$
$$Y = y \frac{D}{f}$$
$$Z = D$$

where x and y represent a coordinate of a gaze pixel on the base image.

A distance to gaze point P is thus found by using $\Delta d$ between images obtained in position deviation operation portion 213, and a three-dimensional model can be created.

Figure 12:
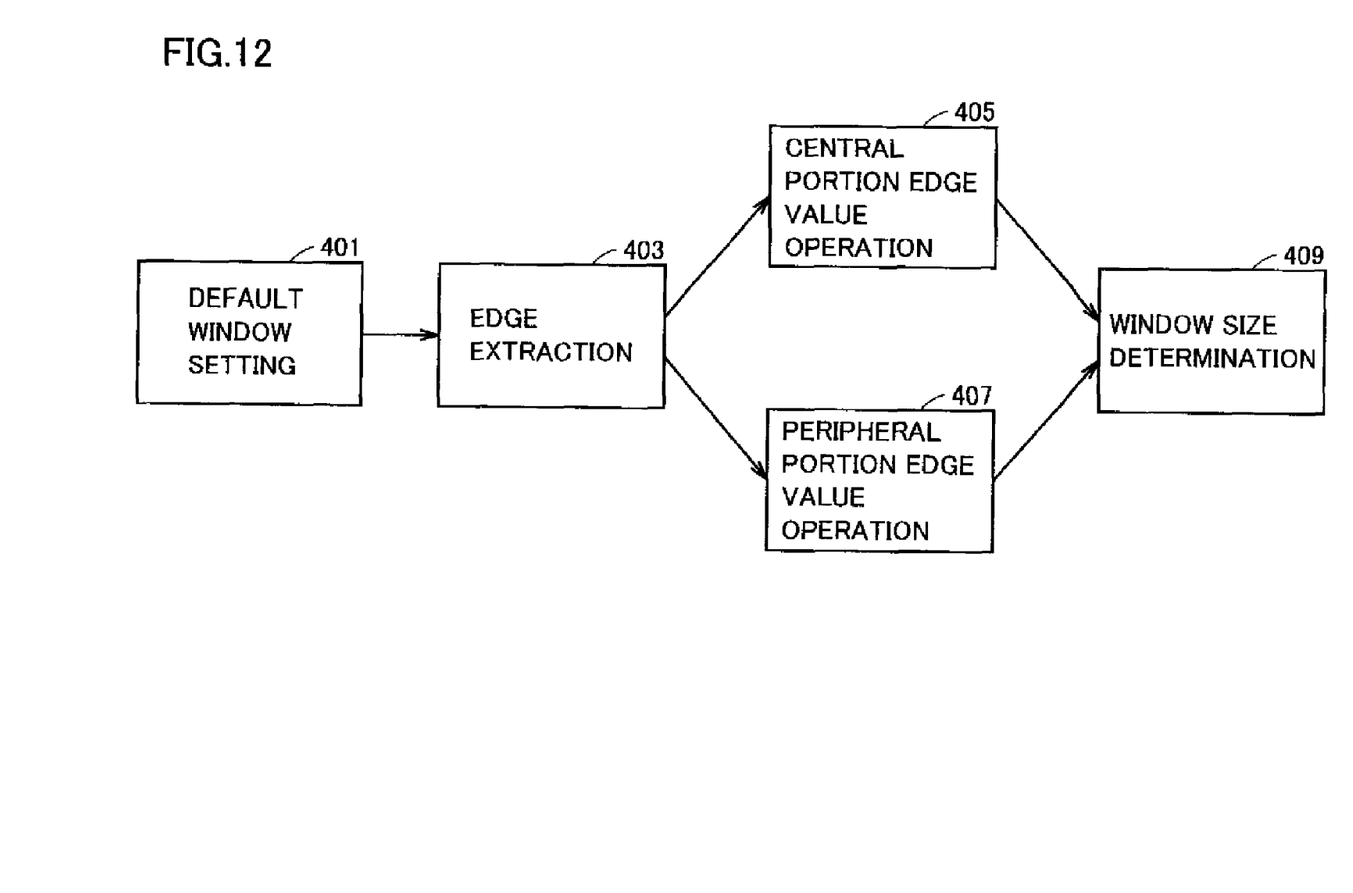
FIG. 12 illustrates a configuration of a window setting portion 201.

A configuration of window setting portion 201 will be described with reference to FIG. 12. Window setting portion 201 is constituted of a default window setting portion 401 for setting a window of a prescribed size centered on the gaze point, an edge extraction portion 403 for extracting an edge component from the image in the window, a central portion edge value operation portion 405 for operating an edge value in the central portion of the window, a peripheral portion edge value operation portion 407 for operating an edge value in the peripheral portion of the window, and a window size determination portion 409 for determining a size of the window to be used for the base image based on a result of operation.

Window setting portion 201 extracts an edge area in the window and changes the window size based on edge distribution. More specifically, when edge distribution is present in the window central portion, the window is made smaller. Alternatively, when edge distribution is present not in the central portion of the window but in the peripheral portion as well, the window is made smaller. The shape of the window may be set in accordance with edge distribution. For example, an aspect ratio of the window may be varied.

Processing for determining a window size will be described with reference to FIG. 13.

Default window setting portion 401 sets a default window centered on the gaze point. This is a window covering a greatest area shown with a size A in FIG. 13.

Edge extraction portion 403 obtains an edge image by filtering the image in the window of size A through a Laplacian filter.

Central portion edge value operation portion 405 operates an edge value in the central portion of the window of size A. In FIG. 13, the edge value in a smallest area C-1 in the central portion shown to have a size C and the edge value in an area C-2 including area C-1 and larger than area C-1 and smaller than the area of size A are operated. Here, the edge values of areas C-1 and C-2 are denoted as L(C-1) and L(C-2) respectively.

The edge value can be operated, for example, by calculating an average of pixel values of an edge image within an area of interest.

Peripheral portion edge value operation portion 407 operates edge values of areas S-1 to S-8 that are outer peripheral portions (peripheral portions) in the window of size A. Here, the edge values of areas S-1 to S-8 are denoted as L(S-1) to L(S-8) respectively.

Window size determination portion 409 determines the size of the window as follows (here, th1 represents a prescribed threshold value).

If [L(C-1)>th1] Window Size: Size C
else If [L(C-1)≈L(S-1)]&[L(C-1)≈L(S-2)]& ... &[L(C-1)≈L(S-8)] Window Size: Size A
else
if [L(C-1)>L(C-2)] Window Size: Size C
else Window Size: Size B Namely, (1) When there is great edge in area C-1 in the center, a smallest window is used so as to find a detailed three-dimensional coordinate of that position.

(2) When condition (1) above is not applicable and when there is not much difference in the edge value between area C-1 in the center and peripheral areas S1 to S8, variation of the shape is determined as less and a largest window is used to carry out image matching.

(3) When condition (2) above is not applicable either and when the edge value in area C-1 of the smallest size is greater than the edge value in area C-2 of an intermediate size, the smallest window is used.

(4) When condition (3) above is not applicable either, a window of size B is used in order to indicate that the edge is great in area C-2.

Figure 14:
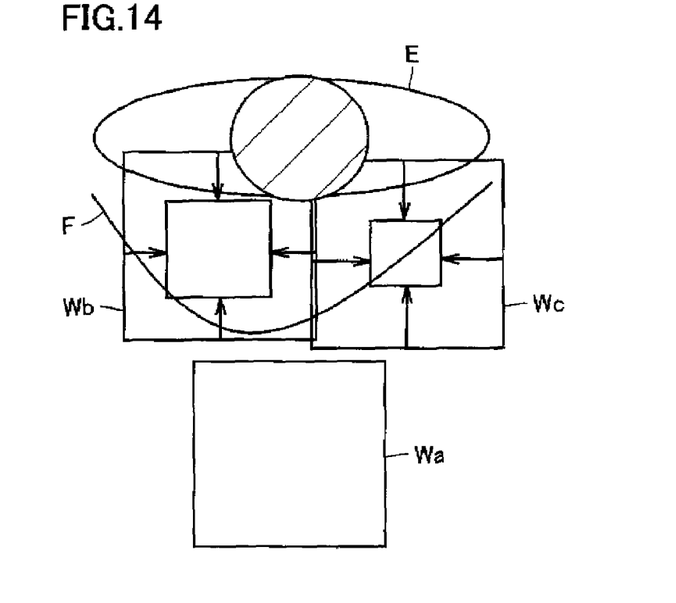
FIG. 14 illustrates a specific example of the base image and exemplary setting of a window size.

A specific example of the base image and exemplary setting of a window size will be described with reference to FIG. 14. Here, an example where a face of a person is picked up as the base image is shown, and the window is set around the eye. The eye is indicated with E and a wrinkle under the eye is indicated with F.

As shown with Wc, when an edge component such as a wrinkle in the central portion of the default window is equal to or greater than a threshold value, the window of size C is selected. Alternatively, as shown with Wa, when there is not much difference in the edge between the central portion and the peripheral portion in the default window, the window of size A is selected. Alternatively, as shown with Wb, when there is an edge component in the peripheral portion of the window of size B, the window of size B is selected.

As a result of such processing, in an example of 3D reconstruction of a face, a large window is used for the cheek for establishing correspondence so that a smooth surface shape can be reproduced. Alternatively, a small window is used for an area around the eye so that shape measurement can be achieved with high resolution.

[First Variation]

Figure 13:
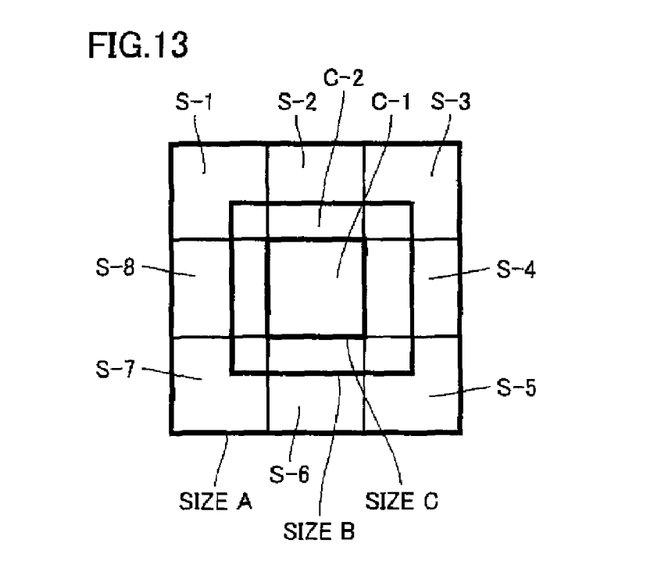
FIG. 13 is a diagram for illustrating processing for determining a window size.
Figure 15:
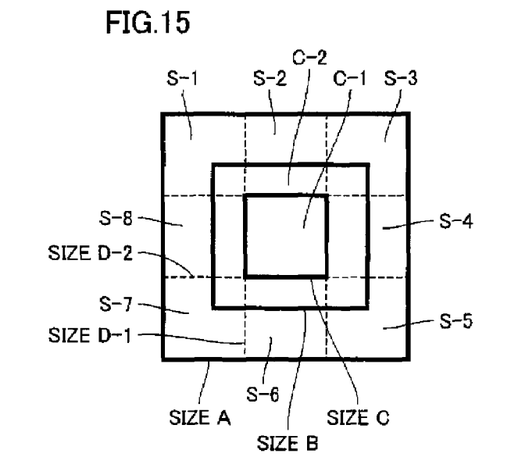
FIG. 15 is a diagram showing a first variation of window setting, corresponding to FIG. 13.

FIG. 15 is a diagram showing a first variation of window setting, corresponding to FIG. 13. The windows having sizes A, B and C in FIG. 15 are similar to those in FIG. 13. In addition, areas C-2 and C-1 similarly correspond to the windows of sizes B and C respectively, and areas S1 to S8 similarly serve as peripheral portions of the window of size A.

In FIG. 15, a vertically long window constituted of areas S-2, C-1 and S-6 is defined as a window of size D-1. In addition, a horizontally long window constituted of areas S-8, C-1 and S-4 is defined as a window of size D-2.

Thus, it is not necessarily required to set the window to a square.

Regarding a method of determining a window shape, denoting an edge value in each window as L(*), If [L(C-1)>th1] Window Size: Size C
else If [L(C-1)≈L(S-1)]&[L(C-1)≈L(S-2)]& . . . &[L(C-1)≈L(S-8)] Window Size: Size A
else
if [L(C-1)≈L(S-8)]&[L(C-1)≈L(S-4)] Window Size: Size D-2
else if [L(C-1)≈L(S-2)]&[L(C-1)≈L(S-6)] Window Size: Size D-1
else
if [L(C-1)>L(C-2)] Window Size: Size C
else Window Size: Size B.

Namely, (1) When there is great edge in area C-1 in the center, a smallest window is used so as to find a detailed three-dimensional coordinate of that position.

(2) When condition (1) above is not applicable and when there is not much difference in the edge value between area C-1 in the center and peripheral areas S1 to S8, variation of the shape is determined as less and a largest window is used to carry out image matching.

(3) When condition (2) above is not applicable either and when similar edge components are successively present in a lateral direction from the gaze point, a horizontally long window is set.

(4) When condition (3) above is not applicable either and when similar edge components are successively present in a vertical direction from the gaze point, a vertically long window is set.

(5) When condition (4) above is not applicable either and when the edge value in area C-1 of the smallest size is greater than the edge value in area C-2 of an intermediate size, the smallest window is used.

(6) When condition (5) above is not applicable either, a window of size B is used in order to indicate that the edge is great in area C-2.

It is noted that the size or the shape of the window may be varied based on an image feature value such as texture information or luminance distribution, without limited to the edge information.

In the embodiment described above, a configuration in which an image feature value is extracted from a window set by window setting portion 201 in the base image has been illustrated, however, the window for extracting the image feature value may be set on any of base image I1 and reference image I2.

[Second Variation]

In the embodiment described above, a configuration using phase-only correlation (POC) as a method of searching for a corresponding point in a stereo image has been illustrated, however, the search method is not limited thereto. Alternatively, for example, a similarity peak search method or the like may be employed. Processing in an example where this similarity peak search method is used to achieve stereo correspondence will be described hereinafter.

Referring again to FIGS. 6 and 7, initially, as in the case of using phase-only correlation (POC), window W1 centered on gaze point P is set on base image I1 (FIG. 6) and window W2 corresponding to the gaze point in base image I1 is set on reference image I2 (FIG. 7). Thereafter, scan of reference image I2 through window W2 is performed, and windows W1 and W2 are compared with each other. As a result of comparison, window W2 closest in pattern to window W1 on base image I1 (smallest in a distance between patterns) is set as a corresponding window on the reference image.

Here, a distance between the pattern of window W1 on base image I1 and the pattern of window W2 on reference image I2 is calculated based on correlation operation, SSD operation, SAD operation, and the like between these windows. Specifically, a distance between patterns is calculated in accordance with equations below.

(1) Calculation of Correlation Value $$D(d) = \sum_{(x,y) \in W} (I_1(x, y) \cdot I_2(x+d, y))$$

(2) Calculation of SAD Value $$D(d) = \sum_{(x,y) \in W} |I_1(x, y) - I_2(x+d, y)|$$

(3) Calculation of SSD Value $$D(d) = \sum_{(x,y) \in W} (I_1(x, y) - I_2(x+d, y))^2$$

The distance between patterns calculated in accordance with the equations above is converted to a similarity value. This similarity value is determined such that it is greater as the distance between the patterns is smaller. For example, when similarity is normalized in a range from 0 to 1, a similarity value S(d) is calculated as in the following conversion equation.

$$S(d) = \frac{1}{D(d)+1}$$

In this conversion equation, when the distance between the patterns is "0", the similarity is "1".

In addition, peak and vicinity thereof may be subjected to similarity operation in a unit of sub pixel, for example, by using parabola fining, based on the similarity value calculated in the processing as above.

Figure 16:
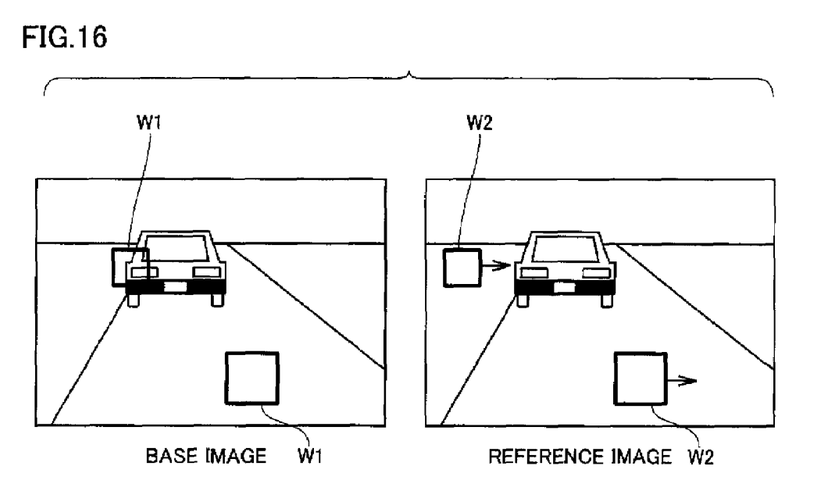
FIG. 16 is a diagram for illustrating application to a camera mounted on a vehicle, utilizing stereo three-dimensional measurement according to the present invention.

In the embodiment described above, an example where the present invention is applied to face authentication based on stereo three-dimensional measurement has been illustrated, however, the present invention is also applicable, for example, to a camera mounted on a vehicle utilizing stereo three-dimensional measurement.

Referring to FIG. 16, for example, a relatively small window is used for a portion high in contrast, such as a vehicle area in the front, so that a distance can be measured with higher lateral resolution. Alternatively, a relatively large window is used for a portion low in contrast, such as a road surface, to carry out robust distance measurement.

Effects of Embodiment

According to the embodiment above, in stereo correspondence using such a search method as the phase-only correlation (POC) method, a size of a window, for which correlation calculation is performed, can adaptively be changed in accordance with a texture distribution state in a window for correspondence. In POC processing, the size of the window has characteristics, in connection with spatial resolution and insusceptibility to noise, contrary to each other. There is a demand for achieving lower influence of noise by making greater a window size for a portion not requiring spatial resolution while making smaller a window size for a portion requiring the same. The present embodiment can adapt to such a situation by controlling the window size based on distribution of an image feature value (texture information, luminance distribution, edge information, or the like) in the window.

[Others]

The processing in the embodiment described above may be performed by using software or a hardware circuit.

A program for performing the processing in the embodiment described above may also be provided, and the program may be provided to a user, in a manner recorded in a recording medium such as a CD-ROM, a flexible disk, a hard disk, a ROM, a RAM, and a memory card. Alternatively, the program may be downloaded to an apparatus via a communication line such as the Internet.

It should be understood that the embodiments above are illustrative and non-restrictive in every respect. The scope of the present invention is defined by the terms of the claims, rather than the description above, and is intended to include any modifications within the scope and meaning equivalent to the terms of the claims.

The invention claimed is:

1. An image processing apparatus, comprising:
   an image input portion for receiving a base image and a reference image;
   a first window setting portion for setting a first window on one of said base image and said reference image;
   a second window setting portion for setting a second window on the other of said base image and said reference image;
   an extraction portion for extracting at least one image feature value from the image in said first window;
   a modification portion for modifying said first window in at least one of a size and a shape thereof based on extracted said image feature value and modifying said second window in a size or a shape thereof in accordance with modification to said first window; and
   an operation portion for performing an operation to specify correspondence between the image in the modified first window and the image in the modified second window, wherein
   said extraction portion measures an edge value in a central portion of said first window, and
   said modification portion reduces the size of said first window when the edge value in the central portion of said first window is equal to or greater than a prescribed value.

2. The image processing apparatus according to claim 1, wherein
   said image feature value includes an edge value of the image.

3. The image processing apparatus according to claim 1, wherein
   said operation portion finds one point in said reference image corresponding to one point in said base image, based on a correlation value between the image in said first window and the image in said second window.

4. The image processing apparatus according to claim 1, further comprising a three-dimensional coordinate operation portion for operating a three-dimensional coordinate of an object included in said base image and said reference image, based on a result of operation by said operation portion.

5. The image processing apparatus according to claim 1, wherein
   said extraction portion extracts edge distribution in said first window, and
   said modification portion determines at least one of the size and the shape of said first window based on said edge distribution.

6. An image processing apparatus, comprising:
   an image input portion for receiving a base image and a reference image;
   a first window setting portion for setting a first window on one of said base image and said reference image;
   a second window setting portion for setting a second window on the other of said base image and said reference image;
   an extraction portion for extracting at least one image feature value from the image in said first window;
   a modification portion for modifying said first window in at least one of a size and a shape thereof based on extracted said image feature value and modifying said second window in a size or a shape thereof in accordance with modification to said first window; and
   an operation portion for performing an operation to specify correspondence between the image in the modified first window and the image in the modified second window, wherein said extraction portion measures an edge value in a central portion and an edge value in a peripheral portion in said first window, and said modification portion reduces the size of said first window when difference between the edge value in the central portion and the edge value in the peripheral portion in said first window is equal to or greater than a prescribed value.

7. The image processing apparatus according to claim 6, wherein said image feature value includes an edge value of the image.

8. The image processing apparatus according to claim 6, wherein said operation portion finds one point in said reference image corresponding to one point in said base image, based on a correlation value between the image in said first window and the image in said second window.

9. The image processing apparatus according to claim 6, further comprising a three-dimensional coordinate operation portion for operating a three-dimensional coordinate of an object included in said base image and said reference image, based on a result of operation by said operation portion.

10. The image processing apparatus according to claim 6, wherein said extraction portion extracts edge distribution in said first window, and said modification portion determines at least one of the size and the shape of said first window based on said edge distribution.

11. A method of controlling an image processing apparatus, comprising the steps of:

receiving a base image and a reference image;

setting a first window on one of said base image and said reference image;

setting a second window on the other of said base image and said reference image;

extracting at least one image feature value from the image in said first window;

modifying said first window in at least one of a size and a shape thereof based on extracted said image feature value and modifying said second window in a size or a shape thereof in accordance with modification to said first window; and performing an operation to specify correspondence between the image in the modified first window and the image in the modified second window, wherein the step of extracting includes measuring an edge value in a central portion of the first window, and the step of modifying includes reduces the size of said first window when the edge value in the central portion of said first window is equal to or greater than a prescribed value.

12. A computer readable-medium containing a set of instructions, when a processor executes the set of instructions, the processor performing the steps of:

receiving a base image and a reference image;

setting a first window on one of said base image and said reference image;

setting a second window on the other of said base image and said reference image;

extracting at least one image feature value from the image in said first window;

modifying said first window in at least one of a size and a shape thereof based on extracted said image feature value and modifying said second window in a size or a shape thereof in accordance with modification to said first window; and performing an operation to specify correspondence between the image in the modified first window and the image in the modified second window, wherein the step of extracting includes measuring an edge value in a central portion of the first window, and the step of modifying includes reduces the size of said first window when the edge value in the central portion of said first window is equal to or greater than a prescribed value.

13. An image processing apparatus, comprising:

a pair of image pick-up portions each for picking up an image of an identical subject and obtaining a stereoscopic image including a base image and a reference image;

a first window setting portion for setting a first window on said base image;

a second window setting portion for setting a second window on said reference image; and an operation portion configured to extract at least one image feature value from the image in any one window of said first window and said second window by measuring an edge value in a central portion of said first window, modify said one window in at least one of a size and a shape thereof based on extracted said image feature value and modifying the other window in a size or a shape thereof in accordance with modification to said one window, wherein said operation portion reduces the size of said first window when the edge value in the central portion of said first window is equal to or greater than a prescribed value, and perform an operation to specify correspondence between the image in one of the modified windows and the image in the other of the modified windows.

* * * * *